United States Patent [19]
Fetterman et al.

[11] Patent Number: 5,751,986
[45] Date of Patent: May 12, 1998

[54] COMPUTER SYSTEM WITH SELF-CONSISTENT ORDERING MECHANISM

[75] Inventors: Michael A. Fetterman, Hillsboro; Glenn J. Hinton, Portland; David B. Papworth, Beaverton; Andrew F. Glew, Hillsboro; Robert P. Colwell, Portland, all of Oreg.

[73] Assignee: Intel Corporation, Santa Clara, Calif.

[21] Appl. No.: 778,515

[22] Filed: Jan. 3, 1997

Related U.S. Application Data

[63] Continuation of Ser. No. 547,023, Oct. 23, 1995, abandoned, which is a continuation of Ser. No. 205,843, Mar. 1, 1994, abandoned.

[51] Int. Cl.$^6$ .................................. G06F 9/38; G06F 15/16
[52] U.S. Cl. ......................... 395/394; 395/473; 395/800
[58] Field of Search .................................. 395/468, 471, 395/472, 473, 477, 479, 394, 383, 587, 800

[56] References Cited

U.S. PATENT DOCUMENTS

| | | | |
|---|---|---|---|
| 4,916,652 | 4/1990 | Schwarz et al. | 364/748 |
| 5,125,083 | 6/1992 | Fite et al. | 395/383 |
| 5,168,547 | 12/1992 | Miller et al. | 395/821 |
| 5,197,130 | 3/1993 | Chen et al. | 395/800 |
| 5,208,914 | 5/1993 | Wilson et al. | 395/859 |
| 5,226,130 | 7/1993 | Favor et al. | 395/585 |
| 5,261,071 | 11/1993 | Lyon | 395/467 |
| 5,353,426 | 10/1994 | Patel et al. | 395/445 |
| 5,363,495 | 11/1994 | Fry et al. | 395/555 |
| 5,377,336 | 12/1994 | Eickemeyer et al. | 395/383 |
| 5,388,222 | 2/1995 | Chisvin et al. | 395/481 |
| 5,420,991 | 5/1995 | Konigsfeld et al. | 395/477 |
| 5,428,761 | 6/1995 | Herlihy et al. | 395/457 |
| 5,467,473 | 11/1995 | Kahle et al. | 395/800 |

OTHER PUBLICATIONS

Peleg et al., "Future Trends in Microprocessors: Out-of-Order Execution, Speculation Branching and Their CISC Performance Potential" Mar. 1991 pp. 263–266.

"Detecting Violations of Sequencial Consistency," Kourosh Gharacholoo and Phillip B. Gibbons, SPAA, 1991.

"Reasoning About Parallel Architectures," William W. Collier, Prentice Hall, 1992.

"The Metaflow Architecture", pp. 10–13 and 63–73, by Val Popescu, Merle Schultz, John Spracklen, Gary Gibson, Bruce Lightner, and David Isaman, IEEE Micro, 1991.

Johnson, Mike; *Superscalar Microprocessor Design*; Prentice–Hall; 1991.

DuBois, et al.; "Synchronization, Coherence, and Event Ordering in Multiprocessors"; Computer, vol. 21, No. 2; pp. 9–21; Feb. 1988.

Gharacholoo, et al.; "Memory Consistency and Event Ordering in Scalable Shared–Memory Multiprocessors"; *17th Annual International Symposium on Computer Architecture*; pp. 15–26; May 28–31, 1990.

Adve, et al.; "Weak Ordering –A New Definition"; *17th Annual International Symposium on Computer Architecture*; pp. 2–14; May 28–31, 1990.

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A computer system including a processor having a inherently weakly-ordered memory model comprising a mechanism for emulating strong-ordering to produce self-consistent ordering on a system-wide basis. The processor snoops the system bus externally to determine if a STORE on the external bus hits a LOAD buffer inside the memory subsystem of the processor. If so, the situation is flagged as one which carries the risk of violating processor ordering rules. When the STORE hits the same LOAD address in the LOAD buffer of the processor's memory subsystem, the speculative state of the processor is erased. This cancels the LOAD operation in all subsequent operations. The processor then begins executing from the aborted LOAD; this time loading the newly updated value.

34 Claims, 5 Drawing Sheets

| ENTRY | ADDR OF LOAD | PDEST | SNOOP HIT |
|---|---|---|---|
| 1 | ADDR = 2 | 4 | |
| ⋮ | ⋮ | ⋮ | ⋮ |
| 8 | ADDR = 5 | 17 | |
| ⋮ | ⋮ | ⋮ | ⋮ |
| 12 | ADDR = 5 | 20 | 1 |
| ⋮ | ⋮ | ⋮ | ⋮ |

COMPUTER SYSTEM WITH SELF-CONSISTENT ORDERING MECHANISM

This is a continuation of application Ser. No. 08/547,023, filed Oct. 23, 1995, now abandoned which is a continuation of application Ser. No. 08/205,843, filed Mar. 01, 1994, now abandoned.

FIELD OF THE INVENTION

The present invention relates to the field of event ordering in computer systems. More specifically, the invention relates to methods and apparatus for synchronizing computer processes, maintaining data coherence, and ordering events in a computer system including one or more microprocessors.

BACKGROUND OF THE INVENTION

For decades, computer scientists and engineers have struggled to successfully develop data processing systems made up of a number of interconnected microprocessors to increase the available computing power and speed. These types of computer systems are alternatively referred to as multiple microprocessor systems, multi-processor systems, or multiple instruction stream, multiple data stream computers.

In a multi-processor computer system, jobs or processes may be multi-tasked among the system's global resources. Often times, individual processors in a multi-processor system share a common memory. The processors usually communicate through shared variables in memory, with LOADs and STOREs accessing shared-memory locations. Theoretically, multi-tasked microprocessor-based systems are capable of efficiently executing processes in a way that offer significant advantages in manufacturing, price, performance, and reliability over traditional computer families. But the design and programming of multi-processor computer systems presents a number of complex problems.

One of the difficulties with implementing a multi-processor computer system is that synchronization must be available to coordinate processes. Synchronization also implies that data coherence must be maintained since processors can access single, shared-memory addresses.

Additional problems have arisen with the advent of data processing machines capable of issuing multiple independent instructions per clock cycle. These machines are commonly referred to as "superscalar" machines. In a superscalar computer system, the microarchitecture is capable of simultaneously fetching, decoding, and executing multiple integer operations in each clock cycle. In most cases, two instructions are issued per clock cycle, with the instructions being pipelined in pairs. (The term "pipelining" is well-understood by practitioners in the microprocessor field as referring to the technique of overlapping the fetch, decode, execute, memory-access and writeback result stages of consecutive instructions being executed in a processing unit.) By way of example, superscalar computer designs are discussed in the book entitled, "Superscalar Microprocessor Design," by Mike Johnson, Prentice-Hall (1991).

As mentioned, memory coherence is an important aspect of a multi-processor computer system, and refers to a system's ability to execute memory operations correctly. A memory system is considered coherent if the value returned on a LOAD instruction is the same value which was given by the most recent STORE instruction to the same address. The problem in a multi-processor system is that data accesses may be buffered, and therefore may not be atomic. This gives rise to the problem of properly ordering storage accesses and execution of events involving the exchange of data between processes. This is commonly referred to as the problem of ordering of events.

Existing multi-processor systems may be classified into two logical models of machine behavior: strongly-ordered and weakly-ordered behaviors. It is appreciated that in multi-processor computer systems, shared-memory processors can affect each other's executions through the sharing of writeable data, and through other communication signals. Computer systems that maintain sequentially consistent ordering are referred to as strongly-ordered systems. Weakly ordered systems, on the other hand, permit re-sequencing of instructions to boost performance. Note that a weakly-ordered memory model facilitates execution of processor instructions in an out-of-order, pipelined manner.

The problem in implementing a multi-processor system that includes a processor having a weak-ordering memory model is that strong-ordering still must be enforced for synchronizing variables. The problem of synchronizing variables in a multiprocessor computer systems is discussed in the articles: "Synchronization, Coherence, and Event Ordering in Multiprocessors," by DuBois et al., *Computer*, Vol. 21, No. 2 (February 1988); "Memory Consistency and Event Ordering in Scalable Shared-Memory Multiprocessors," by Gharachorloo et al., 17th *Annual International Symposium on Computer Architecture*, May 28–31,1990; and "Weak Ordering—A New Definition," by Adve et al., 17th *Annual International Symposium on Computer Architecture*, May 28–31, 1990.

As will be seen, the present invention is a computer system which includes a processing engine that executes instructions in accordance with a weakly-ordered memory model. The computer system includes a mechanism for producing self-consistent processor ordering to maintain correctness and predictability of execution results on a system-wide basis.

SUMMARY OF THE INVENTION

To overcome the aforementioned drawbacks of the prior art, the present invention provides a computer system including a processor having an inherently weakly-ordered memory model. The computer system further includes a mechanism for emulating strong-ordering to produce self-consistent ordering on a system-wide basis.

In one embodiment, order emulation is achieved by the processor snooping the system bus externally. If a STORE on the external bus hits a LOAD buffer inside the memory subsystem of the processor, the situation is flagged as one which carries the risk of violating processor ordering rules. Snooping the STORE on the external bus, where that STORE hits the same LOAD address in the LOAD buffer of the processor's memory subsystem, leads to the conclusion that the data value must have been changed at some time (presumably by another agent coupled to the system bus). Because a processor having a weakly-ordered memory model can execute a program of instructions out-of-order, the solution to the problem of order and relation is to erase the speculative state of the processor, which cancels the LOAD operation and all subsequent operations. The processor then begins executing from the aborted LOAD; this time loading the newly updated value.

BRIEF DESCRIPTION OF THE DRAWINGS

The present invention will be understood more fully from the detailed description which follows and from the accompanying drawings, which, however, should not be taken to limit the invention to the specific embodiments shown, but rather are provided for explanation and understanding only.

DETAILED DESCRIPTION

The present invention is a computer system with a self-consistent memory ordering mechanism. In the following description, numerous specific details are set forth, such as particular circuits, architectures, processes, in order to provide a thorough understanding of the present invention. It should be understood, however, that these specific details need not be used to practice the present invention. In other instances, well-known structures, circuit blocks and architectural functions, have not been shown in detail in order to avoid unnecessarily obscuring the present invention.

Figure 1:
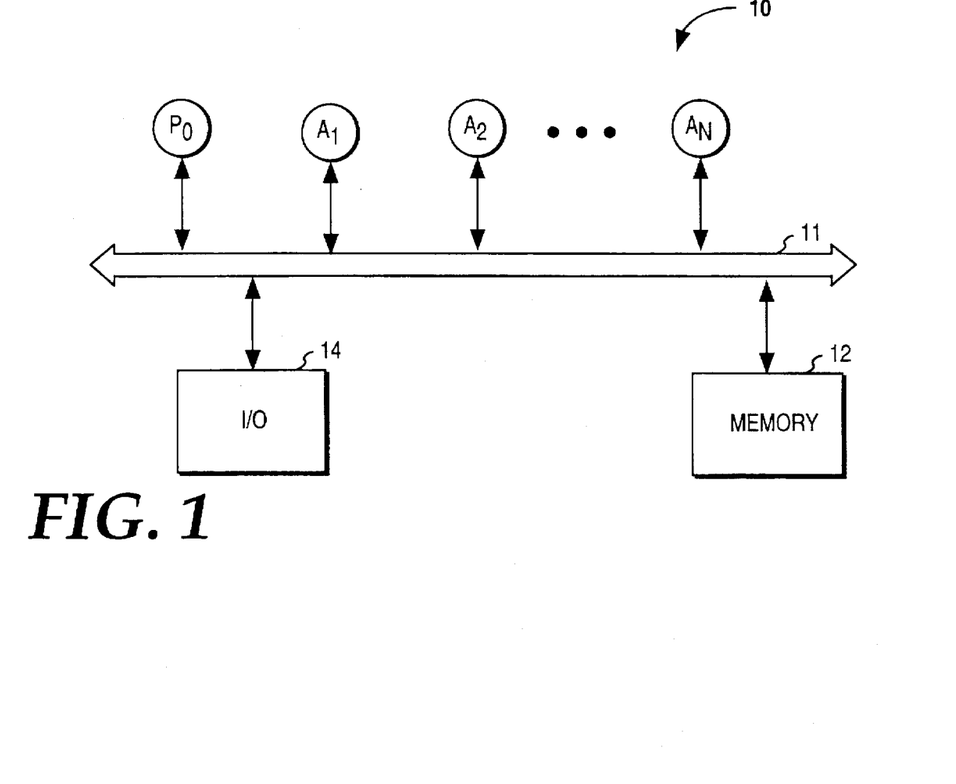
FIG. 1 illustrates the computer system of the present invention.

FIG. 1 illustrates the computer system 10 of the present invention, which includes a system bus 11 coupled to a main memory 12, and one or more input/output (I/O) devices 14. Processor $P_0$ and agents $A_1, A_2, \ldots A_N$, are also shown being coupled to bus 11. By way of example, agents $A_1-A_N$ may comprise well-known devices such as disk controllers, other microprocessors, state machines, DMA devices, serial ports, etc., that communicate along system bus 11.

To understand the problems that can arise in such a system, consider the case in which one of the agents coupled to system bus 11 is another processor, $P_1$. In such a configuration, computer system 10 comprises a multi-processing system in which processors $P_0$ and $P_1$ may execute programs and share data concurrently. Thus, maintaining correctness and predictability of execution results is a complex problem.

The problem is exacerbated in the case where processor $P_0$ comprises a machine which is weakly-ordered; that is, one that is capable of executing instructions in an out-of-order manner. In a multi-processing computer system including a processor that executes instructions out-of-order (i.e., a weakly-ordered memory model), a plethora of different instruction interleavings between processors is possible.

Figure 2:
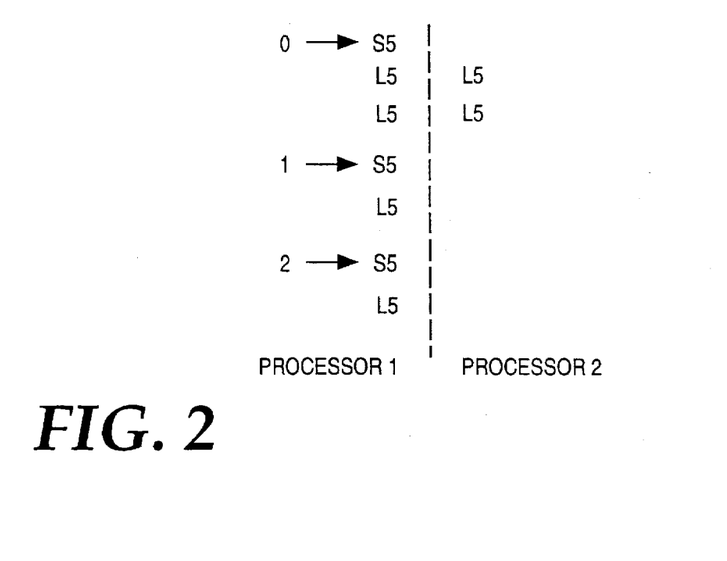
FIG. 2 is an example illustrating how data flow dependencies may arise in a multi-processor computer system.

Consider, the example illustrated in FIG. 2. FIG. 2 shows a sequence of operations being performed by two different processors in a shared-memory multi-processor system. As can be seen, processor $P_0$ (Processor 1) executes a program in which the number zero is initially stored into memory location 5. This is followed by two successive LOAD operations to memory location 5. Next, a number one is stored in location 5, followed by another LOAD operation to the same memory location. Finally, the number two is stored in location 5 followed by another LOAD to location 5.

At the same time, processor $P_1$ (Processor 2) executes a program consisting of two consecutive LOAD operations to memory location 5. As mentioned, in a shared memory system a number of different instruction interleavings is possible, resulting in an expansive number of possible execution results. To illustrate the possible types of interleavings, note that the first LOAD operation performed by processor $P_1$ can occur either before or after any one of the STORE operations being performed by processor $P_0$ to the same memory location. This means that the first LOAD operation being performed by processor $P_1$ may return either a 0, 1, or 2—depending upon how the instructions are interleaved. Likewise, the second LOAD operation to memory location 5 performed by processor Pi may produce the same uncertain results. As will be seen shortly, the present invention includes an ordering mechanism that ensures sequentially consistent results.

In accordance with one embodiment of the present invention, processor $P_0$ comprises a dataflow architecture in which the actual execution of instructions is postponed until their operands are available. This means that instructions may be executed potentially out-of-order with respect to the original order of the source program.

Figure 3:
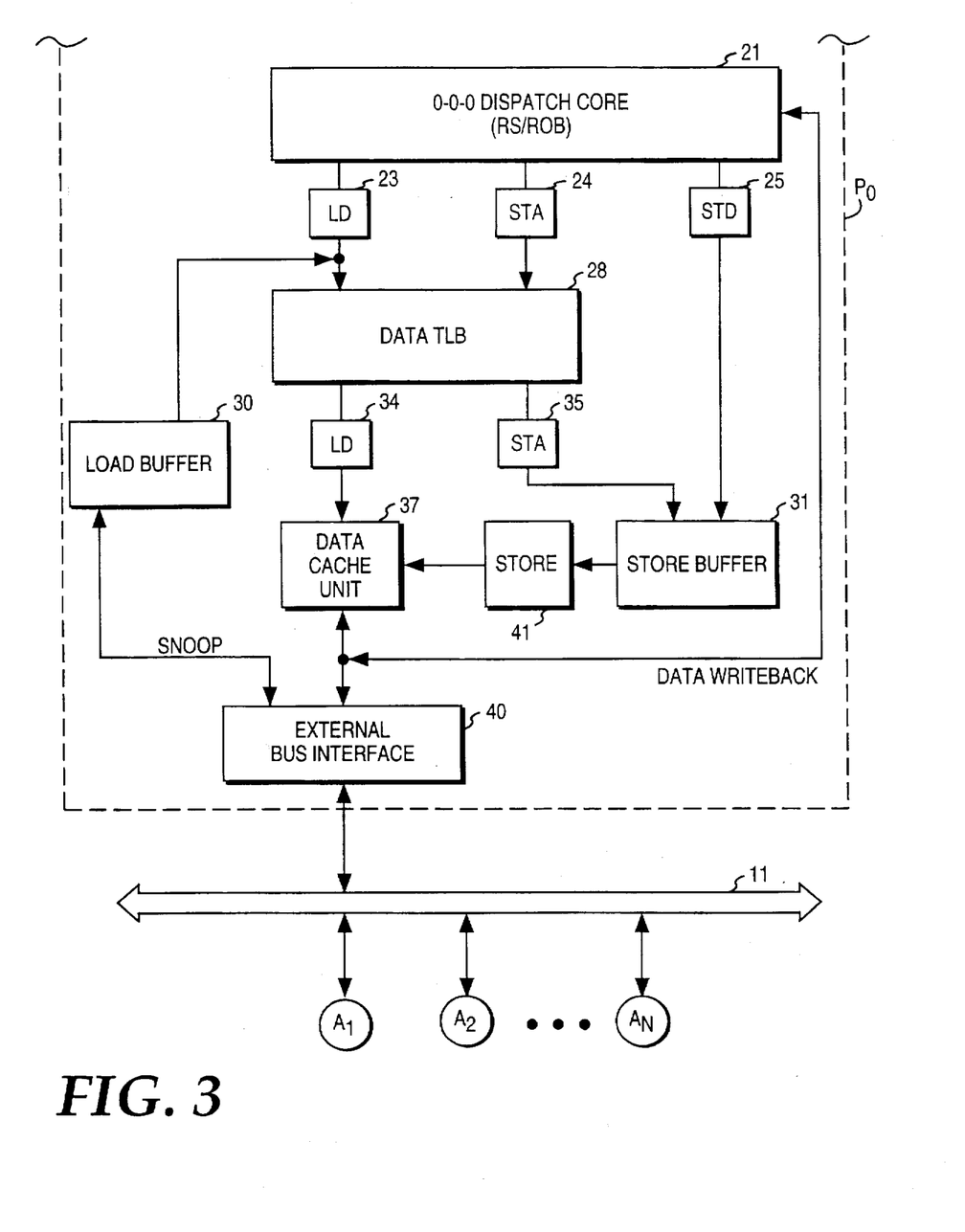
FIG. 3 is a block diagram of the memory subsystem of a processor incorporated into one embodiment of the computer system of the present invention.

FIG. 3 is a block diagram of the memory subsystem of processor $P_0$ in one embodiment of the computer system of the present invention. It is appreciated that other subsystem architectures may be utilized in order to practice the present invention. During execution of a program within processor $P_0$ an instruction is first fetched and then decoded into one or more primitive operations. These primitive operations (called "micro-operations" or "micro-ops") then flow through the machine—potentially being executed out-of-order with respect to one another—until they are ultimately retired. Thus, the operation of the processor $P_0$ is best understood as a series of processes involving micro-operations which are issued from a set of different macro-instructions and which communicate through a set of buffers.

The execution of a program with processor $P_0$ begins with the fetching of instructions from memory, and placement of the fetched instructions into a buffer or queue. Next, the instructions are converted into a set of primitive micro-operations. A separate allocation process determines which of the many physical registers results of the micro-operations are to be steered to. Once resources have been allocated, the appropriate operands are fetched and made ready by placing them into a reservation station (RS). The reservation station is a buffer that holds micro-operations that have not yet executed. When data is ready for a given instruction, the RS dispatches instruction to one of a plurality of execution units according to data dependencies and execution unit availability. Once the execution unit performs the requested operation, a writeback is performed back to the reservation station.

The out-of-order engine of processor $P_0$ also includes a re-order buffer (ROB), which is a functional unit where speculative results are collected, re-ordered and then retired. Retirement is the active process of removing a completed micro-instruction from the re-order buffer and committing its state to whatever permanent architectural state is designated by the original source program.

With continuing reference to FIG. 3, the memory subsystem receives dispatches (mostly memory READs and memory WRITEs) from the out-of-order (O-O-O) dispatch core 21. Dispatch core 21 includes the processor's reservation station and re-order buffer. The memory subsystem receives dispatches from the reservation station and returns data and fault information back to the RS and ROB. When the memory subsystem receives a memory READ (i.e., a LOAD) micro-operation, it may issue a request to bus 11 to read data from external memory 12 (see FIG. 1). When the subsystem receives a memory WRITE (i.e., a STORE) micro-operation, it may write data back to external memory 12, a peripheral I/O device, or to another agent coupled to system bus 11. Since the reservation station of core 21 operates based on data flow dependencies, the memory subsystem of processor $P_0$ needs to detect violations of memory ordering.

The memory subsystem of FIG. 3 includes a data cache unit (DCU) 37 comprising an 8 K 2-way set associative array, with a cache line size of 32 bytes in a current embodiment. DCU 37 is partitioned into four data banks. This allows two accesses (one LOAD, one STORE) at the same time as long as they are on separate banks. DCU 37 also provides a two cycle access time on LOADs and STOREs that hit the cache. Furthermore, DCU 37 is a non-blocking cache, which means that it can process incoming accesses while continuing to process cache misses utilizing external bus 11 (via external bus interface 40). Data cache unit 37 includes four fill buffers, each 256-bits wide, that are used to store outstanding cache accesses. DCU 37 stalls cache misses only when all fill buffers are busy. DCU 37 uses a Modified/Exclusive/Shared/Invalid (MESI) protocol to support cache coherency for multi-processor systems.

The memory subsystem of processor $P_0$ further comprises a data translation look-aside buffer (DTLB) 28 that translates linear addresses to physical addresses for memory accesses. DTLB 28 performs a look-up in a cache array containing the mapping from the linear-to-physical address space. DTLB 28 also caches memory region information with each physical address, and can perform two address translations each clock cycle.

In a current embodiment, DTLB 28 contains a small page array and a large page array. The small page array contains array address information for 4K page sizes and contains 64 entries. The large page array contains address information for 2M and 4M page sizes and contains eight entries. Both arrays are four-way set associative caches. DTLB 28 also checks memory accesses for protection privileges, exceptions, traps, data breakpoints, etc. If the translation buffer detects an exception of any sort, it returns fault information to the re-order buffer of dispatch core 21, and notifies the rest of the subsystem to abort the access.

The memory subsystem of FIG. 3 also includes a memory order buffer (MOB) that controls dispatching within the memory subsystem. In FIG. 3, the memory ordering buffer is illustrated as comprising load buffer 30 and store buffer 31. These buffers handle all LOAD and STORE operations and track the progress of these operations as they move through the processor. When an operation is dispatched and cannot complete due to an address or resource conflict, the MOB blocks the operation and stores the dependency information. Load buffer 30 contains 16 entries, while store buffer 31 contains 12 entries in a current embodiment. The entries of load buffer 30 and store buffer 31 are allocated as micro-operations, and are issued into the ROB of O-O-O dispatch core 21.

The memory order buffer functions as a kind of second-order reservation station. The MOB re-dispatches blocked operations when the blocking source is removed. Some memory operations cannot execute speculatively, so it monitors the retirement process and dispatches non-speculative operations at the correct time. The memory order buffer also dispatches memory writes (i.e., STOREs) to data cache unit 37.

By way of example, FIG. 3 illustrates how core 21 dispatches a store operation that gets decoded into two micro-operations: a store address micro-operation (STA) and a store data operation (STD), illustrated by blocks 24 and 25, respectively. Load micro-operations dispatched by core 21 are illustrated by block 23 in FIG. 3.

All micro-ops dispatched by the reservation station are tracked by the load and store buffers. For example, store data micro operations are directly entered into store buffer 31, whereas store address and load data micro-operations are translated by DTLB 28 to their physical addresses. Physical addresses for the load data and store address micro-operations are shown in FIG. 3 by blocks 34 and 35, respectively. Store address micro-ops are entered into store buffer 31, while load data micro-ops are sent to the load buffer and data cache unit 37.

As described earlier, data cache unit 37 either provides the appropriate physical data back to dispatch core 21, or issues a memory access to main memory via external bus interface unit 40 and system bus 11. Note that when both store address and store data micro-ops have dispatched, and are no longer speculative, the memory order buffer of the memory subsystem combines them, and dispatches them as a STORE, as shown by block 41, to DCU 37. In many cases, Stores are buffered well after retirement, since they create no dependency on other operations.

It should be also noted that the memory subsystem of processor $P_0$ in the current embodiment includes a page miss handler (not shown in FIG. 3). The page miss handler services page misses for DTLB 28. A page miss occurs when the TLB fails to translate the address. The page miss handler performs a page walk to find the page information for an operation that missed the translation look-aside buffer. The page miss handler comprises an ordinary state machine in which page walks are performed in hardware on a speculative basis.

It should be understood that STORE operations cannot execute speculatively or out-of-order because there is no way to recover from a write that should not have happened. Store address and calculation of store data, however, can execute speculatively and out-of-order, to increase processor performance.

As explained above, STORE operations are split into two micro-operations: a store address (STA) and a store data (STD). The STA micro-operation is illustrated by block 24 and is an address calculation and translation. The STD micro-operation is illustrated by block 25 and comprises a data conversion operation. Both of these operations write their data into store buffer 31, which is physically partitioned across three units. The memory order buffer contains a linear address, status, and micro-operation information. DCU 37 contains the actual physical addresses.

In one embodiment, store buffer 31 contains twelve entries, holding up to twelve STORE operations. Store buffer 31 is used to queue up all STORE operations before they dispatch to memory. Buffer 31 also checks all LOADs for store address conflicts. This checking keeps the LOADs consistent with previously executed STOREs still remaining in the store buffer.

Load buffer 30 contains sixteen buffer entries, holding up to sixteen loads. The load buffer is used to queue up LOAD operations. All LOADs go into the load buffer, so they can be snooped; they are re-dispatched from there. The queue operations are then re-dispatched by load buffer 30 when the conflict has been removed. Processor ordering is maintained for LOADs by snooping external WRITEs against completed LOADs. In accordance with the present invention, an agent's WRITE to a speculatively read memory location forces the out-of-order engine to clear and restart the LOAD operation. This aspect of the invention will be described in more detail shortly.

Within the memory subsystem, resources are allocated when a STORE or LOAD operation is issued into the reservation station. Buffers 30 and 31 receive speculative load and store address operations from the reservation station within the dispatch core 21. A LOAD operation decodes into one micro-operation, while a STORE operation is decoded into store data and store address micro-operations. At allocation time, the operation is tagged with its eventual location in either buffer 30 or 31. The reservation station provides the opcode while the processor's address generation unit calculates and provides the linear address for an access. These operations are either executed immediately or are written into the memory order buffer for dispatch at a later time.

During execution, DTLB 28 converts the linear address into a corresponding physical address, or otherwise signals a page miss to the page miss handler. In the case of a LOAD, data cache unit 37 is expected to return the data to core 21. In parallel, address and status bits are written into the load buffer to signal the operation's completion.

In the computer system of the present invention, strong-ordering is emulated by processor $P_0$ even though it is an inherently weakly-ordered machine. That is, $P_0$ is a processor that is capable of executing instructions out-of-order; $P_0$ allows LOADs to pass LOADs, yet it presents the architectural model of strong ordering (i.e., no passing) through speculative processor ordering. All completed and non-retired LOAD operations snoop external bus 11 for external STOREs (i.e., WRITEs). If an external WRITE address matches a non-retired LOAD address, then a processor ordering violation is flagged. Instead of retiring the flagged LOAD, as would normally be done, the LOAD is aborted along with all subsequent micro-operations. The processor then starts re-issuing micro-ops starting with the aborted LOAD.

In a current embodiment of the present invention this sequence of steps is known as a RONuke operation. In a RONuke operation, the LOAD is canceled; the speculative progress of the computer system is aborted, and the processor starts executing from the canceled LOAD.

Another way of looking at the problem which can occur between processors of a multi-processing system is that if LOADs execute out-of-order another processor's STORE operations appear out-of-order. This results from a later LOAD passing an earlier LOAD that has not yet been executed. The later LOAD reads old data while the earlier LOAD, once executed, has the chance of reading new data written by another processor. If allowed to commit its architectural state, these LOADs would violate processor ordering rules. To prevent this from occurring, load buffer 30 watches (i.e., snoops) all data WRITEs on external bus 11. This is illustrated by FIG. 3 by the snoop line coupling load buffer 30 to external bus 11 through bus interface unit 40. If another processor writes a location that was speculatively read, the LOAD and subsequent operations are cleared and re-executed to get the correct data.

Returning once again to the example of FIG. 2, assume that processor #1 has a strong-ordering memory model, i.e., memory operations are assumed to occur in the original program order. Also, assume that processor #2 is an out-of-order processor, e.g., processor $P_0$. When processor #2 is ready to execute the first LOAD operation to memory location 5, external bus 11 is snooped by load buffer 30 to determine if there is a risk of violating strong-ordering. For example, if the LOAD to memory location 5 is pending execution and a STORE is present on external bus 11 to memory location 5, processor #2 is at risk for violating strong-ordering. In accordance with the present invention, processor #2 takes corrective action to avoid the natural weak-ordering model that would otherwise result. It does this by first destroying the speculative state of the machine, and then re-executing from the aborted LOAD.

Recall that load buffer 30 inside the memory subsystem keeps track of all outstanding LOADs for the processor at any given point in time. If a LOAD has happened—or is about to happen in the future—the address is present in load buffer 30. Processor $P_0$ snoops bus 11 for STOREs from other agents by snooping those addresses. If an address is the same as any address present in load buffer 30 pending execution, then a potential risk for violating strong-ordering exists. Load buffer 30 snoops external bus 11 and looks for STOREs on the bus which match the address present within buffer 30. When the tagged (snoop hit) LOAD entry of the load buffer eventually tries to retire, the machine's state is first destroyed. The processor then begins re-issuing instructions beginning with the aborted LOAD.

Figure 4:
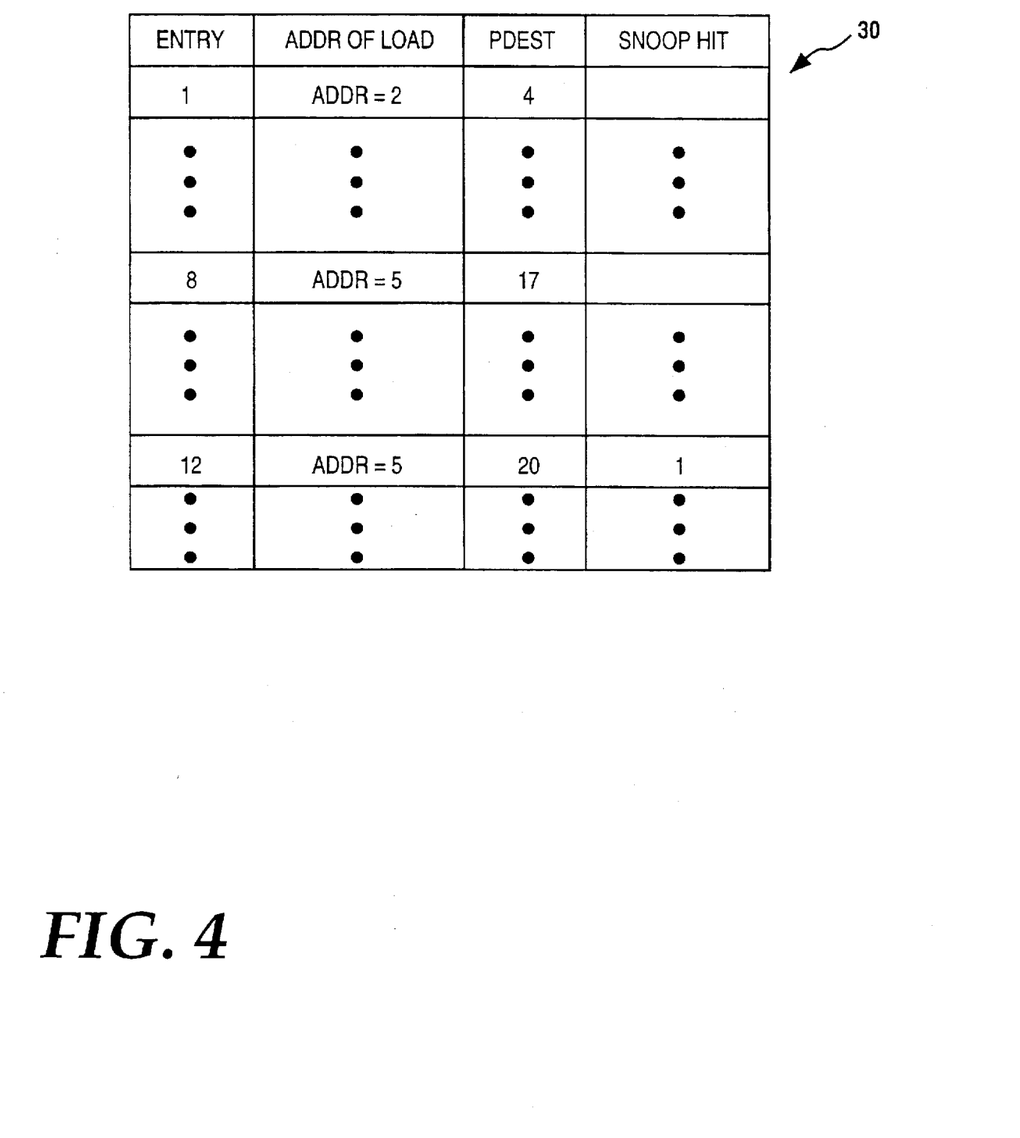
FIG. 4 illustrates the contents of the load buffer utilized in the embodiment of FIG. 3.
Figure 5:
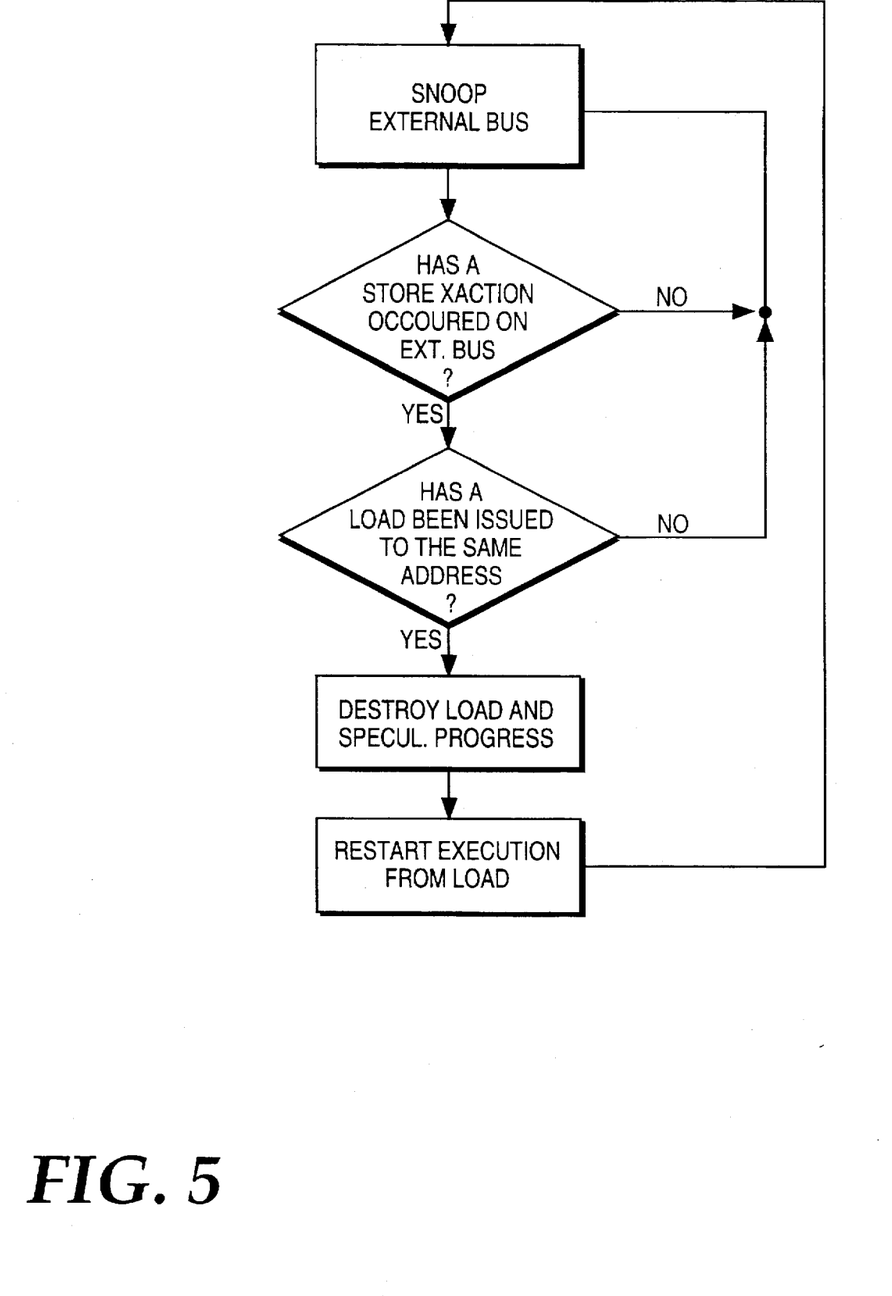
FIG. 5 is a simplified flow diagram of the operation of one embodiment of the computer system of the present invention.
Figure 6:
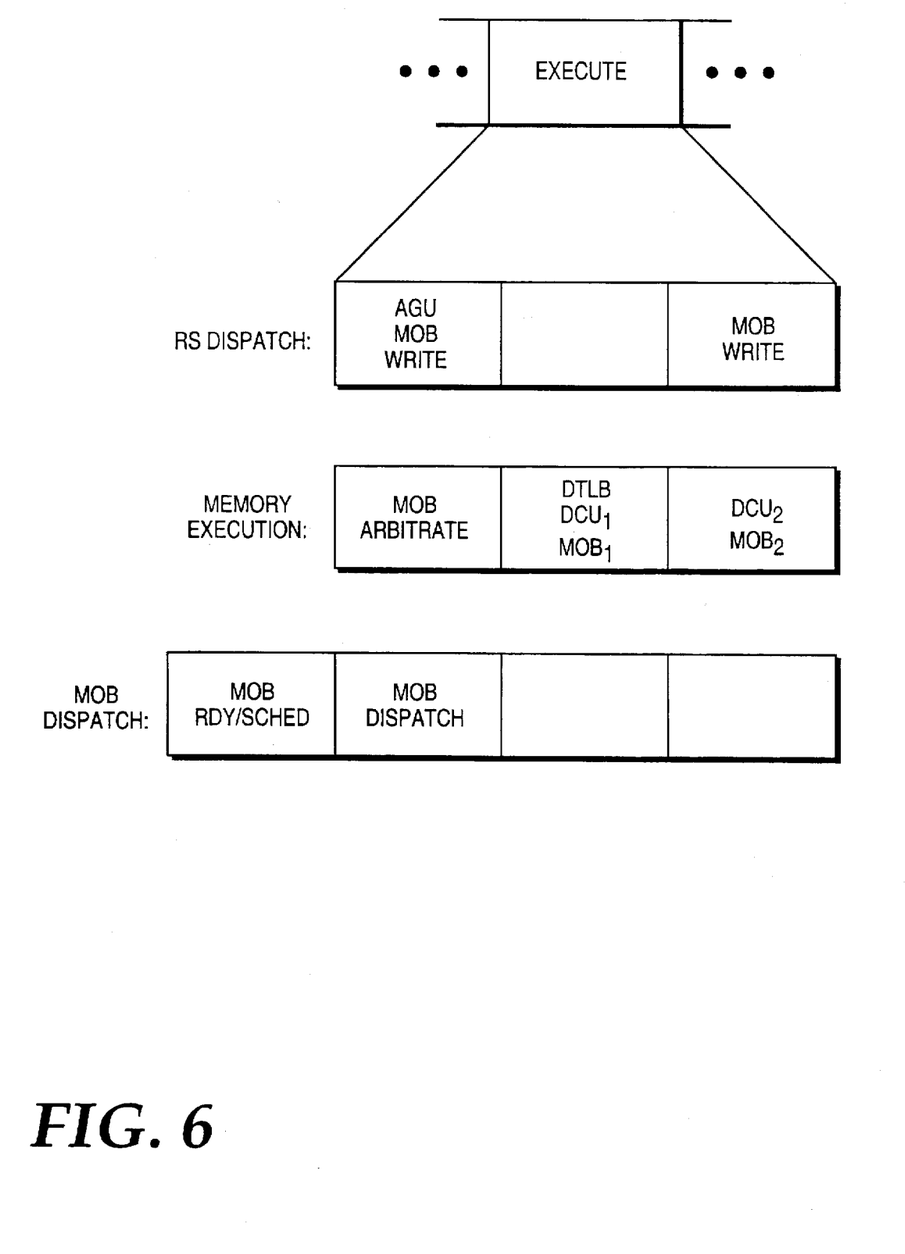
FIG. 6 shows various stages of the execution phase of the processor pipeline in one embodiment of the present invention.

Referring now to FIG. 4, an illustration of what the contents of load buffer 30 might look like for the example of FIG. 2 is shown. Note that in FIG. 4, the physical destination (pdest) of the LOAD represents an entry in the re-order buffer of dispatch core 21. The way that load buffer 30 is filled is that LOADs show up in the reservation station, and when all of the components that are addressed can be computed, the operation is dispatched and placed into load buffer 30.

Assume that entry #8 represents the first LOAD by processor #2 for the example of FIG. 2. Entry #12, on the other hand, represents the second LOAD to memory location 5. Because load buffer 30 is filled out-of-order from the reservation station, entry #12 might be executed first. In this case, data cache unit 37 would return an answer of zero. This result might then get written back into the re-order buffer of core 21, where it would remain until retirement. Note that retirement happens strictly in-order so that the second LOAD operation and its result would remain in the re-order buffer until the first LOAD operation was completed.

Further assume that, in the meantime, processor #1 stores a one into memory location 5. If the LOAD operation stored at entry 8 in buffer 30 is ready to execute, this LOAD will return a value of one. This is because the STORE has already been written to data cache unit 37. Note that even if DCU 37 has a zero stored at memory location 5, it is either going to invalidate that entry or update its copy to match the activity occurring on system bus 11. Either way, the LOAD operation at entry 8 in buffer 30 will return a value of one for the LOAD to memory location 5, resulting in a weakly-ordered memory model.

What happens in a computer system of the present invention is that as soon as the STORE to memory location 5 is detected on bus 11, load buffer 30 (which is constantly snooping system bus 11) scans through all of its entries and determines if there are any matches to that STORE memory location. The matching entries are then tagged. This is shown in FIG. 4 by the snoop hit (=1) for entry 12.

The way that the corrective mechanism ensures self-consistent ordering in the present invention is that when the ROB is ready to retire pdest 20, physical location 20 is sent to the memory subsystem. At that time, if a snoop hit is detected by load buffer 30, the processor generates a RONuke signal which destroys the current LOAD as well as all speculative progress for the machine up to that point. The processor then begins executing from the aborted LOAD. Actually, the ROB arranges to re-fetch that particular LOAD from micro-code and start over at that same point. For the above example, when the LOAD is re-issued, memory location 5 will be updated to the number one.

It is appreciated that every STORE data transaction to external bus 11 is visible to load buffer 30. This is guaranteed in the current embodiment because load buffer 30 operates at a substantially higher frequency than does external bus 11. This makes snooping of external bus 11 relatively straightforward.

We claim:

1. A computer system comprising:
    a processor executing a program of instructions, a number of said instructions being executed out-of-order;
    a bus coupled to said processor;
    at least one agent coupled to said bus for communications thereon;
    a common memory coupled to said bus, said processor and said at least one agent sharing said common memory; and
    an ordering mechanism for synchronizing variables stored in said common memory by comparing an address of a STORE operation present on said bus from said at least one agent, to addresses of LOAD operations which have been issued, but not yet retired, by said processor, said mechanism aborting a first LOAD operation and speculatively processed operations of said processor following said first LOAD operation in said program responsive to a match between said address of said STORE operation and an address of said first LOAD operation.

2. The computer system of claim 1 wherein said at least one agent comprises a second processor.

3. The computer system of claim 2 wherein said second processor has a strongly-ordered memory model.

4. The computer system of claim 2 wherein said second processor has a weakly-ordered memory model.

5. The computer system of claim 1 wherein said processor comprises a load buffer storing addresses of pending, issued, un-retired LOAD operations of said processor.

6. The computer system of claims 1, 2, 3, 4 or 5 wherein said ordering mechanism comprises a means for snooping said bus for said address of store STORE operation from said at least one agent.

7. The computer system of claim 6 wherein said ordering mechanism restarts said processor at said first LOAD operation following abortion of said first LOAD operation and said speculatively processed operations.

8. A multi-processor computer system comprising:
    a system bus;
    a first processor having a strongly-ordered memory model, said first processor being coupled to said system bus;
    a second processor that issues and executes a program of instructions, execution of operations specified by said instructions occurring out-of-order, said second processor communicating with said first processor via said system bus;
    said second processor having a memory subsystem which includes a buffer storing addresses of pending LOAD operations, which have been issued but not yet retired by said second processor, said memory subsystem snooping said system bus for addresses of STORE operations of said first processor, in the event that an address associated with a STORE operation present on said system bus matches an address associated with a LOAD operation in said buffer, said memory subsystem generating a signal causing said second processor to abort said LOAD operation and speculatively processed, un-retired operations of said second processor which follow said LOAD operation in said program, said second processor then restarting said program from said LOAD operation.

9. The computer system of claim 8 further comprising a main memory coupled to said system bus, said first and second processors sharing said main memory such that each can access a single memory address of said main memory.

10. The computer system of claim 9 further comprising a disk controller coupled to said system bus.

11. The computer system of claim 10 wherein said main memory comprises a hard disk drive.

12. The computer system of claim 8 further comprising at least one input/output (I/O) device coupled to said system bus to receive data from said first and second processors.

13. The computer system of claim 8 wherein said second processor is pipelined.

14. The computer system of claim 8 wherein said second processor comprises:
    a dispatch core for dispatching said LOAD operations to said memory subsystem; and
    a bus interface unit coupling said memory subsystem to said system bus.

15. The computer system of claim 14 wherein said memory subsystem further comprises a data cache unit, said memory subsystem generating a bus request to said main memory via said bus interface unit in the event of a miss to said data cache unit in response to said LOAD operation.

16. The computer system of claim 15 wherein said data cache unit operates in accordance with a modified/exclusive/shared/invalid (MESI) protocol.

17. The computer system of claim 15 wherein said memory subsystem further comprises a data translation look-aside buffer for translation of linear addresses generated by said dispatch core into physical addresses.

18. The computer system of claim 14 wherein said dispatch core comprises a reservation station and a re-order buffer.

19. The computer system of claims 8, 9, 10, 11, 12, 13, 14, 15, 16, 17, or 18 wherein said second processor operates at a substantially higher frequency as compared to said system bus.

20. In a computer system wherein processes are multi-tasked among a set of global resources which includes a processor that executes operations specified by instructions out of an original program order, said processor communicating with a plurality of agents across a system bus, a method of ordering events to maintain synchronization comprising the steps of:
    storing addresses of LOAD operations that have been issued, but not yet retired, by said processor, as entries in a buffer;
    snooping said system bus by said processor for an address of a STORE operation associated with one of said agents which is a match to an address of a LOAD operation stored in said buffer; and
    aborting a speculative state of said processor in response to said match.

21. The method of claim 20 further comprising the step, prior to said aborting step, of aborting said LOAD operation.

22. The method of claim 21 further comprising the additional step of reissuing said aborted LOAD operation.

23. The method of claim 21 further comprising the step, prior to said step of aborting said LOAD operation, of tagging entries of said buffer which match said address of said STORE operation.

24. The method of claims 20, 21, 22, or 23 wherein said step of aborting said speculative state of said processor occurs just prior to retirement of said LOAD operation.

25. A multi-processor computer system comprising:
- a first processor having a strongly-ordered memory model;
- a second processor that issues and executes a program of instructions, execution of operations specified by said instructions occurring out-of-order, said second processor being coupled to said first processor and having a memory subsystem which includes a buffer storing addresses of pending LOAD operations which have been issued but not yet retired by said second processor, in the event that an address associated with a STORE operation of said first processor matches an address associated with a LOAD operation of said second processor, said memory subsystem causing said second processor to abort said LOAD operation and speculatively processed, un-retired operations of said second processor which follow said LOAD operation in said program, said memory subsystem then restarting said program from said LOAD operation.

26. The computer system of claim 25 further comprising a main memory coupled to said first and second processors, said first and second processors each being operable to access a single memory address of said main memory.

27. In a computer system which includes a first processor having a weakly-ordered memory model, said first processor being operable to execute operations specified by instructions out-of-order, said processor being coupled with a plurality of agents via a bus, said plurality of agents including a second processor having a strongly-ordered memory model, a method of operation comprising the steps of:
- (a) storing, by said first processor, addresses of LOAD operations that have been issued, but not retired, said addresses being stored in a buffer;
- (b) identifying, by said first processor, an address of a STORE operation associated with one of said plurality of agents present on said bus, said address of said STORE operation matching an address of a LOAD operation stored in said buffer; and
- (c) aborting a speculative state of said first processor prior to retirement of said LOAD operation.

28. The method of claim 27 further comprising the step, prior to step (c), of:
tagging addresses of said buffer which match said address of said STORE operation.

29. A processor in which execution of operations specified by instructions may occur out-of-order comprising:
- at least one execution unit that executes the operations;
- an out-of-order dispatch core which includes:
  - a first buffer that holds operations which have been issued, but not yet executed, the first buffer dispatching an operation to the at least one execution unit according to data dependencies and execution unit availability;
  - a second buffer that collects, re-orders, and then retires speculative results of the operations;
- a memory subsystem that provides data specified by the operations to the first and second buffers, the memory subsystem being coupled to an external system bus and including:
  - a memory ordering buffer that controls LOAD and STORE operations dispatched by the first buffer;
  - a load buffer that snoops external STORE operations on the external system bus against completed LOAD operations, wherein an external STORE operation which matches a completed LOAD operation causes the out-of-order dispatch core to clear and restart the completed LOAD operation.

30. The processor of claim 29 wherein the out-of-order dispatch core is further operative to abort speculatively processed operations following the completed LOAD operation prior to restarting the completed LOAD operation.

31. The processor of claim 29 wherein the memory subsystem further comprises:
- a data cache unit; and
- a bus interface unit that couples the memory subsystem to the external system bus, the memory subsystem generating a bus request to a main memory via the bus interface unit in response to a miss to the data cache unit.

32. The processor of claim 29 wherein the memory subsystem further comprises:
a data translation look-aside buffer for translation of linear addresses generated by the out-of-order dispatch core.

33. The processor of claim 31 wherein the memory subsystem further comprises:
a store buffer that queues the STORE operations prior to the STORE operations being dispatched to either the data cache unit or the main memory.

34. The processor of claim 31 further comprising:
a page miss handler that performs a page walk to find page information for a particular operation misses the data translation look-aside buffer.

* * * * *